US012693799B2

(12) United States Patent
Kaiser et al.

(10) Patent No.: US 12,693,799 B2
(45) Date of Patent: Jul. 28, 2026

(54) RECORDING OPERATING DATA OF A MOTORIZED TOOL

(71) Applicant: Andreas Stihl AG & Co. KG, Waiblingen (DE)

(72) Inventors: Michael Kaiser, Waiblingen (DE); André Vaas, Jagstzell (DE); Kay-Steffen Gurr, Heilbronn (DE); Michael Gramm, Stuttgart (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 971 days.

(21) Appl. No.: 17/100,238

(22) Filed: Nov. 20, 2020

(65) Prior Publication Data

US 2021/0157505 A1 May 27, 2021

(30) Foreign Application Priority Data

Nov. 22, 2019  (EP) .................................... 19210888

(51) Int. Cl.
*G06F 3/06* (2006.01)
*H02P 29/024* (2016.01)
(Continued)

(52) U.S. Cl.
CPC .......... *G06F 3/0652* (2013.01); *G06F 3/0604* (2013.01); *G06F 3/0679* (2013.01);
(Continued)

(58) Field of Classification Search
CPC . B25F 5/00; G06F 3/00; G06F 3/0652; G06F 3/0604; G06F 3/067;
(Continued)

(56) References Cited

U.S. PATENT DOCUMENTS 10,032,123 B2  7/2018 Mejegård et al.
10,395,505 B2  8/2019 Kusakawa et al.
(Continued)

FOREIGN PATENT DOCUMENTS

DE      20 2018 105 999 U1    10/2018
WO      WO 2019/105463 A1      6/2019

*Primary Examiner* — Gary S Hartmann
(74) *Attorney, Agent, or Firm* — Crowell & Moring LLP

(57) ABSTRACT

A device records operating data of a motorized tool. The device is arranged on the tool, wherein the device has: a recording and/or evaluation device, wherein the recording and/or evaluation device is designed to record at least one variable, wherein the variable is dependent on an operating state of the tool, and to evaluate the recorded variable in order to identify the operating data, and/or to record the operating data. An operating data memory is provided, wherein the operating data memory is designed to store the identified and/or recorded operating data. A communication interface is designed, in a state connected to an external appliance, to wirelessly transmit the stored operating data thereto. The device is designed, if at least one connection criterion is met by the operating data and/or at least one connection criterion is met, wherein the connection criterion is the fact that the operating data have not been erased from the operating data memory and/or have not been transmitted, to wirelessly transmit connection information in a transmission state different from the connection state by way of the communication interface and/or to output the connection information by way of an output device of the device.

15 Claims, 3 Drawing Sheets

(51) Int. Cl.
   *H04W 4/30*        (2018.01)
   *G07C 3/00*        (2006.01)
   *H04L 67/12*       (2022.01)

(52) U.S. Cl.
   CPC .............. *H02P 29/024* (2013.01); *H04W 4/30*
      (2018.02); *G07C 3/00* (2013.01); *H04L 67/12*
      (2013.01)

(58) Field of Classification Search
   CPC ............. G06F 11/3013; G06F 11/3055; G06F
                  11/3072; H02P 29/024; H04L 67/12;
                  H04W 4/30
   See application file for complete search history.

(56)                References Cited

U.S. PATENT DOCUMENTS

| 11,276,889 | B2 * | 3/2022 | Gurr | ........................ | G07C 3/00 |
| 11,386,721 | B2 * | 7/2022 | Russ | ........................ | G07C 3/00 |
| 12,111,621 | B2 * | 10/2024 | Abbott | .............. | G05B 13/0265 |
| 2004/0236495 | A1 * | 11/2004 | Koenen | ................ | A01D 34/001 |
| | | | | | 701/115 |
| 2016/0342151 | A1 | 11/2016 | Dey, IV et al. | | |
| 2017/0349058 | A1 * | 12/2017 | Bernier | ............. | H02J 13/00004 |
| 2018/0068493 | A1 | 3/2018 | Russ et al. | | |
| 2019/0341660 | A1 | 11/2019 | Gurr et al. | | |
| 2020/0126319 | A1 | 4/2020 | Russ et al. | | |

* cited by examiner

RECORDING OPERATING DATA OF A MOTORIZED TOOL

CROSS REFERENCE TO RELATED APPLICATION

This application claims priority under 35 U.S.C. § 119 from European Patent Application No. 19210888.4, filed Nov. 22, 2019, the entire disclosure of which is herein expressly incorporated by reference.

BACKGROUND AND SUMMARY OF THE INVENTION

The invention relates to a device for recording operating data of a motorized tool, to a system having such a device and to a method for operating such a device, in particular such a system.

The invention is based on the problem of providing devices for recording operating data of a motorized tool, wherein the device has improved properties, a system having such a device and a method for operating such a device, in particular such a system.

The invention solves this problem by providing devices, systems, and methods in accordance with the independent claims. Advantageous developments and/or refinements of the invention are described in the dependent claims.

The in particular electrical device according to the invention is designed or configured to in particular automatically record operating data of a motorized tool. The device is designed or configured to be arranged on, in particular in, the tool. The device has an in particular electrical recording and/or evaluation device. The recording and/or evaluation device is designed or configured to in particular automatically record at least one in particular physical variable, in particular a value of the variable, wherein the variable, in particular its value, is dependent on an operating state of the tool, and to in particular automatically evaluate the recorded variable, in particular its value, in order to identify the operating data. In addition or as an alternative, the recording and/or evaluation device is designed or configured to in particular automatically record the operating data, in particular values of the operating data.

The device additionally has an in particular electrical operating data memory. The operating data memory is designed or configured to in particular automatically store the identified and/or recorded operating data. The device furthermore has an in particular electrical communication interface. The communication interface is designed or configured, in a state connected to an in particular mobile external appliance, to in particular automatically wirelessly transmit the stored operating data thereto. The device is furthermore designed or configured, if at least one connection criterion is met by the in particular stored operating data, in particular their values, and/or at least one connection criterion is met, wherein the connection criterion is the fact that the in particular stored operating data have not, in particular not yet, been erased from the operating data memory and/or have not, in particular not yet, been in particular wirelessly transmitted, to in particular automatically wirelessly transmit connection information, in particular regarding the meeting of the in particular respective connection criterion, in a transmission state different from the connection state by way of the communication interface, and/or, in particular automatically and/or in a manner perceptible to a user, to output said connection information by way of an in particular electrical output device of the device.

In addition or as an alternative, the device has an in particular electrical identification device. The identification device is designed or configured to in particular automatically identify an in particular urgent maintenance state and an in particular acute fault state, different from the maintenance state, of the tool, in particular at least one component of the tool, based on the identified and/or recorded operating data, in particular their values. The device furthermore has an, in particular the and/or electrical output device. The device is furthermore designed or configured, if the maintenance state is identified, to output maintenance information, in particular regarding the identification of the maintenance state, by way of the output device, in particular automatically and/or in a manner perceptible to a user. The device is furthermore designed or configured, if the fault state is identified, to output fault information different from the maintenance information, in particular regarding the identification of the fault state, by way of the output device, in particular automatically and/or in a manner perceptible to a user.

This, in particular the connection information, makes it possible to recognize, in particular for the external appliance or a user, whether it is worthwhile to set up the connection state or there is a need to set up the connection state, in particular whether or not new or previously unknown operating data are available on the device. This thus makes it possible to avoid unnecessary setup of the connection state, in particular for transmitting out-of-date or previously known operating data, in particular if the connection criterion is not met. This thus makes it possible to save time. In addition or as an alternative, this makes it possible for the external appliance in particular to be able to receive connection information from another device, in particular another communication interface, in the state not connected to the communication interface, this in particular not needing to be possible in the state connected to the communication interface.

The device may in particular be designed, if the connection criterion is not met, to transmit and/or to output information or no connection information in this regard. In addition or as an alternative, the communication interface may be designed not to wirelessly transmit the stored operating data in the transmission state, or the connection information may not contain the operating data.

In addition or as an alternative, this makes it possible, in particular the maintenance information and the fault information make it possible, to differentiate between the maintenance state and the fault state, when identified, and thus to be able to recognize whether maintenance or troubleshooting of a fault, in particular repair, of the tool is required. This thus makes it possible to guarantee that the tool is able to be ready for use for an assignment.

The identification device may in particular be designed to identify a compliant state, different from the maintenance state and the fault state, or an intended state of the tool. The device may be designed, if the compliant state is identified, to output compliance information by way of the output device.

The device may be different from the tool. In addition or as an alternative, the external appliance may be different from the tool and/or the device. Again in addition or as an alternative, the connection information may be different from the operating data. The connection information may in particular have a smaller volume, in particular data volume, than the operating data. Again in addition or as an alternative, the maintenance state and/or the fault state and/or the compliant state may be different from the operating data.

Again in addition or as an alternative, the maintenance information and/or the fault information and/or the compliance information may be different from the maintenance state and/or the fault state and/or the compliant state and/or the operating data.

The device may be designed for in particular mechanical coupling to or for attachment or fastening on, in particular in, the tool. The device may in particular be designed for in particular releasable connection to the tool, in particular by virtue of a material connection, such as adhesive bonding, a frictional connection, such as a locking or snap connection, and/or a form-fitting connection, such as screwing. In addition or as an alternative, the device may be arranged on, in particular in, the tool, in particular be part of the tool. As an alternative, the device may be designed separately from the tool. This allows the device to be retrofitted on the tool. The device may in particular be referred to as appliance. Again in addition or as an alternative, the device, when arranged on the tool, may be in direct contact with the tool. Again in addition or as an alternative, the device may be part of a battery, in particular a battery pack, for the tool, in particular for supplying drive power to the tool, in particular in the form of a battery-operated tool.

The tool may be a manual, in particular hand-held or floor-guided tool. Manual, in particular hand-held tool may in particular mean that the tool can have a mass of at most 50 kilograms (kg), in particular of at most 20 kg, in particular of at most 10 kg. In addition or as an alternative, the tool may be a gardening and/or forestry tool or a cultivation tool. The tool may in particular be a saw, or a pruner, or a hedge trimmer, or a hedge cutter, or a woodcutter, or pruning shears, or a blower, or a leaf blower, or a vacuum cleaner, or a leaf vacuum, or a cleaning device, or a high-pressure cleaner, or a sweeper roller, or a sweeping brush, or a lawnmower, or a strimmer, or a scarifier.

The tool may have an electric drive motor or a combustion drive motor.

The recording and/or evaluation device may be designed to wirelessly record the at least one variable and/or the operating data, in particular without an electrical connection to the tool or components of the tool. The recording and/or evaluation device may in particular have a sensor, wherein the sensor may be designed to record the at least one variable. The sensor may in particular be designed such that it is able to record the variable regardless of whether the tool has an electric drive motor or a combustion drive motor. It is thus possible to record variables and thus also operating data for a multiplicity of drive technologies such as combustion motor-driven, wired, battery-based drive technologies, using the same device, in particular without a wired connection to the tool or to components of the tool having to be necessary. Reference is also made in this respect to the relevant specialist literature. In addition or as an alternative, the device may be designed for connection to the tool by way of a cable. The recording and/or evaluation device may be designed to record the at least one variable and/or the operating data by way of the cable. Again in addition or as an alternative, the variable may be dependent on an on state, in particular a non-zero rotational speed, and/or an off state of a drive motor of the tool. Again in addition or as an alternative, the recording and/or evaluation device may have a microcontroller.

The operating data memory may have a non-volatile memory, such as a FLASH memory and/or an EEPROM memory. In addition or as an alternative, the device may be designed to record the operating data periodically at a repetition frequency or sampling rate, for example 1 Hz, and to store them in the operating data memory at the repetition frequency. The storage in the operating data memory may take place under the proviso that the operating data have changed, in particular have reached and/or exceeded at least one predefined threshold value, that is to say storage in the operating data memory may be dispensed with when the operating data are unchanged, as is typically the case in an off state of a drive motor of the tool.

The communication interface may have a WLAN interface and/or a Bluetooth interface. The connection state may in particular also be referred to as connected state. In addition or as an alternative, the transmission state may also be referred to as advertisement state. Again in addition or as an alternative, the connection information may also be referred to as advertising event. Again in addition or as an alternative, the device may be designed to transmit the connection information in the transmission state by way of the communication interface regardless of whether or not the external appliance is within reception range, and/or to regularly transmit said connection information and/or to listen for said connection information temporally after an in particular respective transmission by way of the communication interface following a request to set up the connection state, in particular from the external appliance. Again in addition or as an alternative, the device may be designed to transmit, in the transmission state, with the connection information, an identifier, in particular of the device or of the tool, such as a serial number or a MAC address, by way of the communication interface.

The output may be optical, or the output device may have a display.

The device does not need to be designed for live transmission of the operating data by way of the communication interface and/or for live outputting of the operating data by way of the output device.

The operating data may not have been erased from the operating data memory and/or not have been transmitted if the operating data were identified and/or recorded and/or stored temporally after a last erasure and/or a last transmission.

The external appliance, based on the operating data transmitted by the communication interface in the state connected to said communication interface, may for example evaluate the operating data and display them in optically prepared form to the user.

The tool may in particular either have the compliant state or the maintenance state and/or the fault state. In addition or as an alternative, the device may be designed, if the maintenance state and the fault state are identified, to output the maintenance information and the fault information or only one of the two items of information, in particular the fault information, by way of the output device. Again in addition or as an alternative, the identification device may be designed to identify the maintenance state and the fault state, in particular and the compliant state, based on the operating data, in particular their values, falling below, reaching or exceeding an in particular respective predefined threshold value. Again in addition or as an alternative, the identification device may have a microcontroller.

In one development of the invention, the device has an, in particular the and/or electrical, identification device. The identification device is designed or configured to in particular automatically identify an, in particular the and/or urgent, maintenance state and/or a fault state, in particular the fault state and/or a fault state different from the maintenance state and/or acute fault state, of the tool, in particular at least one component of the tool, based on the identified and/or recorded operating data, in particular their values. The connection criterion is the fact that the maintenance state and/or the fault state are/is identified. The connection information in particular contains an item of, in particular the maintenance information, in particular regarding the maintenance state and/or if the maintenance state is identified, and/or an item of, in particular the fault information and/or fault information different from the maintenance information, in particular regarding the fault state and/or if the fault state is identified. This makes it possible to recognize whether maintenance or troubleshooting of a fault, in particular repair, of the tool is required. The communication interface may in particular be designed, in the state connected to the external appliance, to wirelessly transmit thereto the identified maintenance state or the identified fault state and/or the operating data, based on which the maintenance state or the fault state is identified. In addition or as an alternative, the communication interface may be designed, in the transmission state, not to wirelessly transmit the operating data based on which the maintenance state or the fault state is identified, or the connection information may not contain these operating data. Again in addition or as an alternative, the identification device may be designed to identify a compliant state, different from the maintenance state and the fault state, or an intended state of the tool. The device may be designed, if the compliant state is identified, to transmit and/or to output information or no connection information in this regard.

In one development of the invention, the operating data, in particular their values, are characteristic for an, in particular the compliant state different from the maintenance state and the fault state, the maintenance state and/or the fault state of the tool. The operating data may in particular comprise a rotational speed of a drive motor of the tool, a motor current of the drive motor, a temperature of the tool, in particular of the drive motor, a battery voltage of an, in particular the battery connected to the tool as recorded by the tool and/or a fill level of an operating fluid. When the operating data, in particular their values, in particular fall below, reach or exceed an in particular respective predefined threshold value, it may be necessary to refill the operating fluid or perform a planned exchange of wearable parts of the tool or clean the tool or perform an unplanned exchange or perform an unplanned reset of a defective part of the tool to an intended state, and the maintenance state or the fault state may thus be identified.

In one development of the invention, the operating data contain usage data, in particular at least one time, wherein a drive motor of the tool had an on state at the at least one time. This makes it possible to recognize how the tool has been used. The usage data may in particular contain a non-zero rotational speed of the drive motor at the time. In addition or as an alternative, the time may be accurate to the minute, in particular accurate to 15 minutes, and/or the usage data may contain a runtime, in particular a temporal rotational speed profile, around the time. Again in addition or as an alternative, the usage data may be referred to as runtime history data. Again in addition or as an alternative, storage in the operating data memory may take place under the proviso that the drive motor had the on state uninterrupted for at least a predefined duration, such as one second. Again in addition or as an alternative, the communication interface may be designed not to wirelessly transmit the usage data containing at least the time in the transmission state, or the connection information may not contain the usage data containing at least the time. Again in addition or as an alternative, the communication interface may be designed, in the transmission state, to wirelessly transmit evaluation information evaluated based on the operating data, such as an overall runtime of the drive motor, or the connection information may contain the evaluation information.

In one development of the invention, the operating data are of different types. The connection information contains type information about a type of operating data meeting the in particular respective connection criterion. The operating data characteristic for the maintenance state and/or the fault state may in particular be a type. The connection criterion for the operating data characteristic for the maintenance state and/or the fault state may in particular be that the maintenance state or the fault state is identified, and the operating data characteristic for the maintenance state and/or the fault state have not been erased. In addition or as an alternative, the usage data containing at least the time may be of a different type. The connection criterion for the usage data containing at least the time may in particular be the fact that the usage data containing at least the time have not been transmitted.

In one development of the invention, the device is designed or configured to in particular automatically erase the in particular stored operating data, in particular characteristic for the maintenance state and/or the fault state, based on an erasure command from the operating data memory that is transmitted wirelessly by an, in particular the and/or mobile, external appliance by way of the communication interface in the state connected to said external appliance.

In addition or as an alternative, the device is designed or configured, temporally after in particular wireless transmission of the in particular stored operating data, in particular of the usage data, to in particular automatically erase the transmitted operating data from the operating data memory on account of the transmission.

The erasure command may be instructed in particular due to maintenance or troubleshooting of a fault, in particular repair, of the tool, in particular by the user.

In one development of the invention, the device has an electrical energy store, in particular a battery. The device is designed or configured to supply at least the communication interface with electrical energy from the electrical energy store. The connection information makes it possible to avoid unnecessary setup of the connection state. This thus makes it possible to save energy from the energy store and thus to extend a service life of the energy store. The battery may in particular be a button cell, in particular a CR 2032 button cell or CR 2450 button cell. In addition or as an alternative, the device may be designed to supply the recording and/or evaluation device, the operating data memory, the output device and/or the identification device, when present, with energy from the energy store.

In one development of the invention, the device, at least when an, in particular the drive motor of the tool is in an off state, in particular when the tool is in an inoperative state, is designed or configured to wirelessly transmit and/or output the connection information and/or to output the maintenance information and/or the fault information, in particular and/or the compliance information, when present. This allows transmission and/or outputting regardless of an operative state of the tool, in particular an on state of the drive motor. The device may in particular be designed to transmit and/or to output in the operative state, in particular the on state. In addition or as an alternative, the inoperative state may be caused by the absence of a drive energy source, in particular the lack of connection to a battery. Again in addition or as an alternative, transmission and/or outputting may be made possible by the electrical energy store, when present.

In one development of the invention, the device has an operating element able to be actuated by a user. The device is designed or configured, if the operating element has been actuated, to output the connection information and/or the maintenance information and/or the fault information, in particular and/or the compliance information, when present. This makes it possible to save electrical energy, in particular from the electrical energy store, when present. The device may in particular be designed, if the operating element has not been actuated, in particular for a predefined duration, for example ten seconds, not, in particular no longer, to output.

In one development of the invention, the device has an operating element able to be actuated by a user, in particular the operating element able to be actuated by a user. The operating element is designed or configured for a user to input an, in particular the compliant state different from the maintenance state and the fault state, in particular an item of, in particular the compliance information, and/or the maintenance state, in particular the maintenance information, and/or the fault state, in particular the fault information, and/or another state, in particular another item of information, in particular a reservation state, in particular reservation information, of the tool into the device. This makes it possible to output and/or to transmit information regarding the compliant state, the maintenance state, the fault state and/or the other state, in particular the reservation state, when present, in particular the compliance information, the maintenance information, the fault information and/or the other information, in particular the reservation information, in particular if the identification device has not identified the correct state. The device may in particular be designed such that, for the user input, the operating element needs to be actuated for a predefined duration, such as at least three seconds. In addition or as an alternative, the user input may be referred to as in particular virtual marking. Again in addition or as an alternative, the reservation state may be and/or describe reservation or booking of the tool.

The system according to the invention contains a device as described above.

The system additionally contains the tool.

In addition or as an alternative, the system contains the in particular mobile external appliance.

The external appliance is designed or configured, in the state connected to the communication interface, to in particular automatically wirelessly transmit the stored operating data therefrom.

In addition or as an alternative, the external appliance is designed or configured, in a reception state different from the connection state, to in particular automatically wirelessly receive the wirelessly transmitted connection information.

In addition or as an alternative, the external appliance is designed or configured, in the state connected to the communication interface, to wirelessly transmit the erasure command thereto.

In addition or as an alternative, the external appliance is designed or configured for a user to input at least one item of user information regarding the compliant state and/or the maintenance state and/or the fault state and/or the other state, in particular the reservation state, in particular for wireless transmission to and/or storage in the device and/or an in particular electronic database, in particular of the system.

The external appliance may in particular be designed, when receiving the transmitted connection information, in order to set up the state connected to the communication interface, to in particular automatically request this therefrom. In addition or as an alternative, the external appliance may be any data processing device that may have a suitable wireless communication interface that may be designed for wireless communication with the communication interface of the device. Again in addition or as an alternative, the external appliance may be a terminal. The mobile terminal may in particular be a laptop, a tablet or a smartphone. Again in addition or as an alternative, mobile may be referred to as portable, in particular hand-held. Again in addition or as an alternative, the external appliance may form or be a gateway that is able to forward the transmitted operating data to the database, such as to a cloud solution that is able to store the operating data. The operating data stored in the cloud solution may then be viewed and evaluated by way of a suitable tool, such as a Web browser.

In one development of the invention, the system contains the device having the operating element able to be actuated by a user for a user to input the compliant state and/or the maintenance state and/or the fault state and/or the other state, in particular the reservation state, of the tool into the device. The system is designed or configured, based on actuation of the operating element, to in particular automatically and/or wirelessly authorize the user input and/or the wireless transmission and/or the storage of the user information. This makes it possible to avoid unauthorized access by others.

The device described above may be designed to be able to be used with the motorized tool in order to record operating data of the tool. In other words: Use of the device to record operating data of the motorized tool.

The in particular automatic method according to the invention is designed or configured to in particular automatically operate an, in particular the device as described above, in particular an, in particular the system as described above, wherein the device is arranged on the tool. The method in particular comprises the steps of: Recording, in particular automatically recording, at least the variable, wherein the variable is dependent on the operating state of the tool, and evaluating, in particular automatically evaluating, the recorded variable in order to identify the operating data, and/or recording, in particular automatically recording, the operating data by way of the recording and/or evaluation device. Storing, in particular automatically storing, the identified and/or recorded operating data by way of the operating data memory. If at least the connection criterion is met by the operating data and/or at least the connection criterion is met, wherein the connection criterion is the fact that the operating data have not been erased from the operating data memory and/or have not been transmitted, wirelessly transmitting, in particular automatically transmitting the connection information in the transmission state different from the connection state by way of the communication interface and/or outputting, in particular automatically outputting said connection information by way of the output device of the device. Other objects, advantages and novel features of the present invention will become apparent from the following detailed description of one or more preferred embodiments when considered in conjunction with the accompanying drawings.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
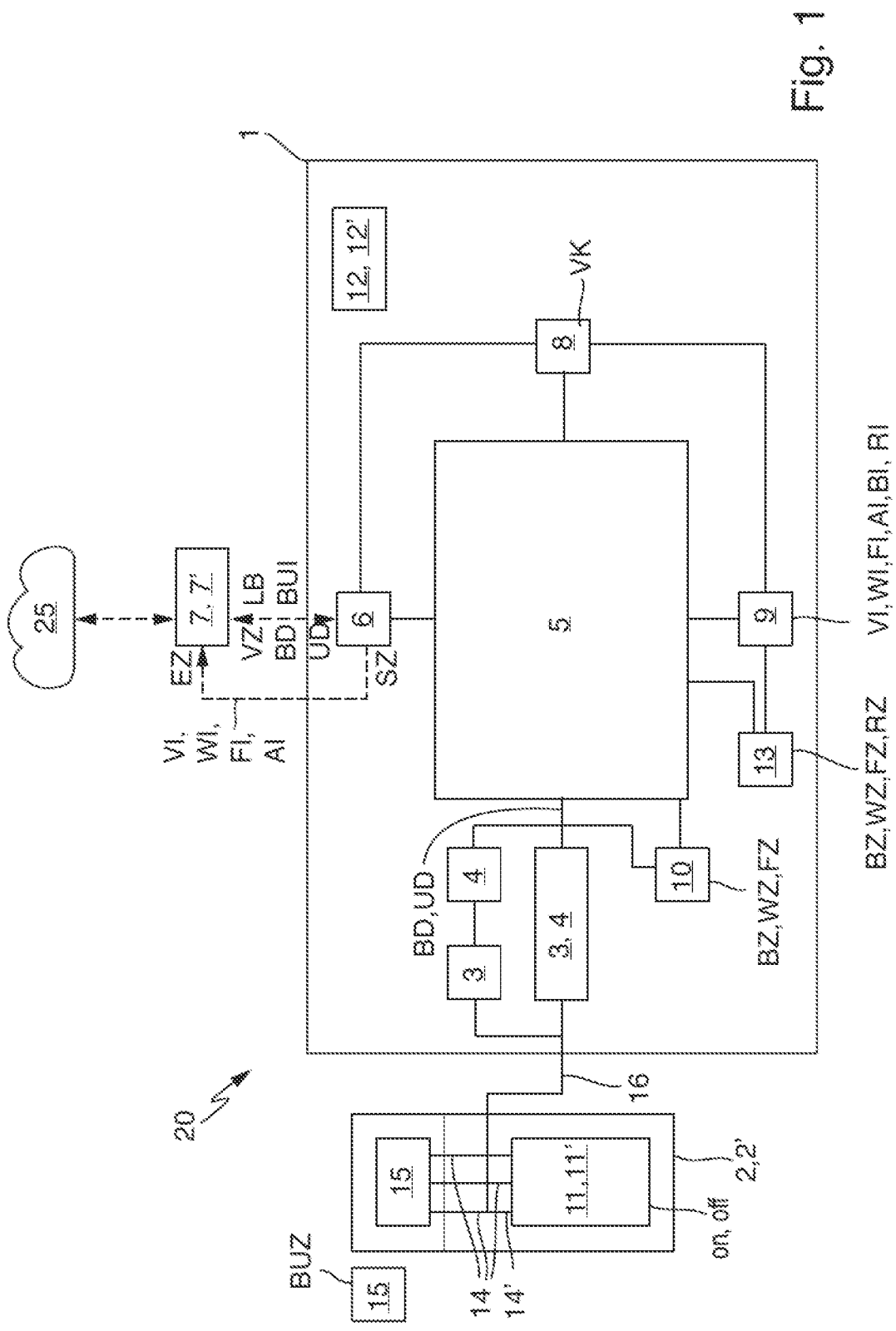
FIG. 1 is a schematic block diagram of an exemplary system according to the invention containing an exemplary device according to the invention and of an exemplary method according to the invention.
Figure 2:
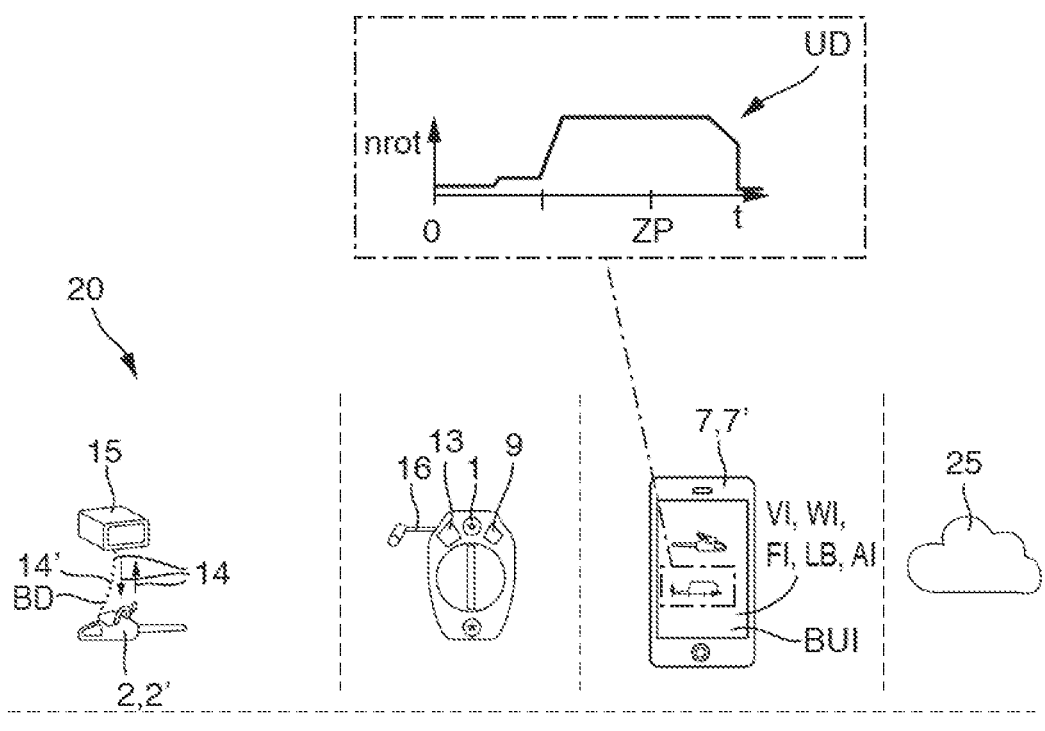
FIG. 2 is a schematic view of the system, of the device and of the method from FIG. 1.
Figure 2:
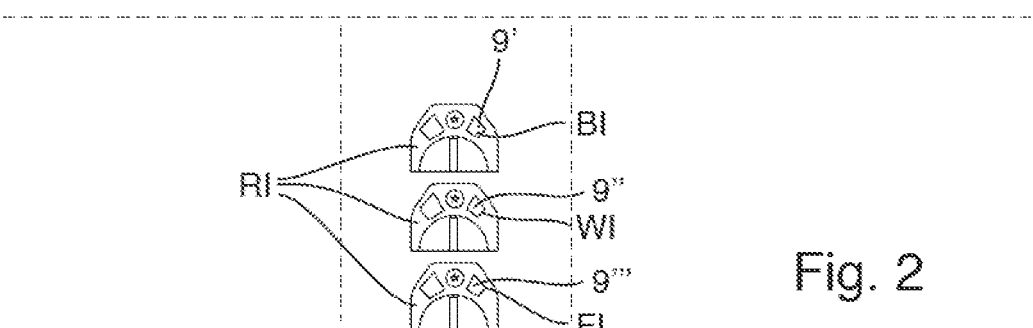
Figure 3:
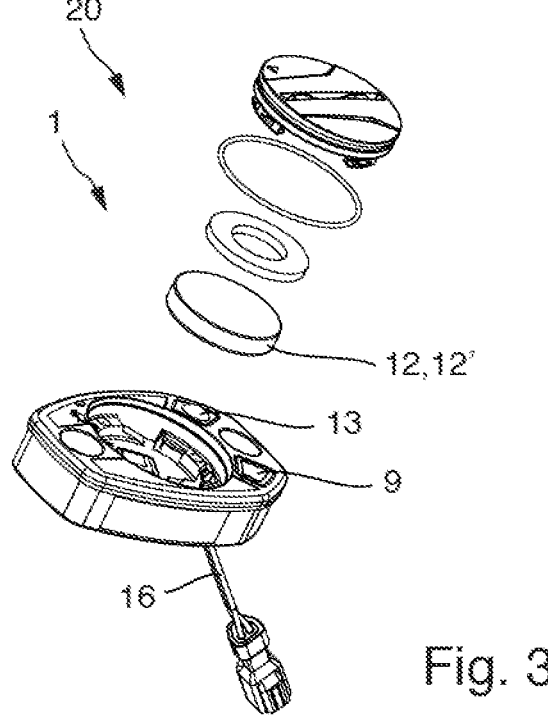
FIG. 3 is a schematic exploded view of the device of the system from FIG. 1.

FIGS. 1 to 3 show a system 20 having a device 1. The device 1 is designed to record operating data BD of a motorized tool 2. The device 1 is designed to be arranged, in particular is arranged, on the tool 2. The device 1 has a recording and/or evaluation device 3, 4. The recording and/or evaluation device 3, 4 is designed to record at least one variable, wherein the variable is dependent on an operating state of the tool 2, and to evaluate the recorded variable in order to identify the operating data BD, as shown in FIG. 1 on the left in an upper path. In addition or as an alternative, the recording and/or evaluation device 3, 4 is designed to record, in particular records, the operating data BD, as shown in FIG. 1 on the left in a lower path.

The device 1 additionally has an operating data memory 5. The operating data memory 5 is designed to store, in particular stores, the identified and/or recorded operating data BD. The device 1 furthermore has a communication interface 6. The communication interface 6 is designed, in a state VZ connected to an external appliance 7, to wirelessly transmit, in particular transmits, the stored operating data BD thereto. The device 1, in particular a control device 8, in the form of a microcontroller in the exemplary embodiment that is shown, is furthermore designed, if at least one connection criterion VK is met by the operating data BD and/or at least one connection criterion VK is met, wherein the connection criterion VK is the fact that the operating data BD have not been erased from the operating data memory 5 and/or have not been transmitted, to wirelessly transmit connection information VI in a transmission state SZ different from the connection state VZ by way of the communication interface 6 and/or to output said connection information VI by way of an output device 9 of the device 1, in particular transmits and/or outputs said connection information.

The device 1 additionally has an identification device 10. The identification device 10 is designed to identify, in particular identifies, a maintenance state WZ and a fault state FZ, different from the maintenance state WZ, of the tool 2 based on the identified and/or recorded operating data BD. The device 1 furthermore has the output device 9. The device 1, in particular the control device 8, is furthermore designed, if the maintenance state WZ is identified, to output, in particular outputs, maintenance information WI by way of the output device 9. The device 1, in particular the control device 8, is furthermore designed, if the fault state FZ is identified, to output, in particular outputs, fault information FI different from the maintenance information WI by way of the output device 9.

FIGS. 1 and 2 additionally show a method for operating the device 1, in particular the system 20. The device 1 is arranged on the tool 2. The method in particular comprises the steps of: Recording at least the variable, wherein the variable is dependent on the operating state of the tool 2, and evaluating the recorded variable in order to identify the operating data BD, and/or recording the operating data BD by way of the recording and/or evaluation device 3, 4. Storing the identified and/or recorded operating data BD by way of the operating data memory 5. If at least the connection criterion VK is met by the operating data BD and/or at least the connection criterion VK is met, wherein the connection criterion VK is the fact that the operating data BD have not been erased from the operating data memory 5 and/or have not been transmitted, wirelessly transmitting the connection information VI in the transmission state SZ different from the connection state VZ by way of the communication interface 6 and/or outputting said connection information VI by way of the output device 9 of the device 1.

In detail, the connection criterion VK is the fact that the maintenance state WZ and/or the fault state FZ are/is identified. The connection information VI in particular contains the maintenance information WI and/or the fault information FI.

In the exemplary embodiment that is shown, the identification device 10 is designed to identify, in particular identifies, a compliant state BZ, different from the maintenance state WZ and the fault state FZ, of the tool 2. The device 1, in particular the control device 8, is designed, if the compliant state BZ is identified, to output, in particular outputs, compliance information BI by way of the output device 9.

The output is in particular optical, or the output device 9 has a display in the form of a green LED 9', a yellow LED 9" and a red LED 9'''. The output device 9 may output the compliance information BI through in particular continuous lighting of the green LED 9'. The output device 9 may also output the maintenance information WI through in particular continuous lighting of the yellow LED 9". The output device 9 may furthermore output the fault information FI through in particular continuous lighting of the red LED 9'''. In alternative exemplary embodiments, the output device may additionally or alternatively output the various information through other colors and/or through different lighting, such as continuous lighting or flashing.

The system 20 additionally contains the tool 2.

In the exemplary embodiment that is shown, the device 1, in particular the recording and/or evaluation device 3, 4, is connected to the tool 2 by way of a cable 16 in order to record the operating data BD.

The tool 2 is in particular a battery-operated tool 2'. The battery-operated tool 2' has a battery interface 14. The battery-operated tool 2' is also connected to a battery 15 by way of the battery interface 14, in particular for a supply of drive power, in particular for a drive motor 11 of the tool 2. The operating data BD are transmitted between the battery-operated tool 2' and the battery 15 via the battery interface 14, in particular a communication line 14' of the battery interface 14. The cable 16 is connected to the battery interface 14.

The drive motor 11 is additionally an electric drive motor 11' in the exemplary embodiment that is shown.

The device 1 is also designed separately from the tool 2 in the exemplary embodiment that is shown.

The system 20 additionally contains the external appliance 7, in the form of a smartphone 7' in the exemplary embodiment that is shown.

The external appliance 7 is designed, in the state VZ connected to the communication interface 6, to wirelessly transmit, in particular transmits, the stored operating data BD therefrom.

The external appliance 7 is additionally designed, in a reception state EZ different from the connection state VZ, to wirelessly receive, in particular receives, the wirelessly transmitted connection information VI.

In the exemplary embodiment that is shown, the external appliance 7 is designed, when receiving the transmitted connection information VI, in order to set up the state VZ connected to the communication interface 6, to request this therefrom, in particular requests this therefrom.

The operating data BD are furthermore characteristic for the compliant state BZ, the maintenance state WZ and/or the fault state FZ of the tool 2.

The operating data BD furthermore contain usage data UD, in particular at least one time ZP, wherein the drive motor 11 of the tool 2 had an on state on at the at least one time ZP.

The operating data BD are additionally of different types. The connection information VI contains type information AI about a type of operating data BD meeting the in particular respective connection criterion VK.

In the exemplary embodiment that is shown, the operating data BD characteristic for the maintenance state WZ and/or the fault state FZ are a type. The connection criterion VK for the operating data BD characteristic for the maintenance state WZ and/or the fault state FZ is in particular that the maintenance state WZ or the fault state FZ is identified, and the operating data BD characteristic for the maintenance state WZ and/or the fault state FZ have not been erased. In addition, the usage data UD containing at least the time ZP are a different type. The connection criterion VK for the usage data UD containing at least the time ZP is in particular the fact that the usage data UD containing at least the time ZP have not been transmitted.

The device 1, in particular the control device 8, is furthermore designed to erase, in particular erases, the operating data BD, in particular characteristic for the maintenance state WZ and/or the fault state FZ, based on an erasure command LB from the operating data memory 5 that is transmitted wirelessly by the external appliance 7 by way of the communication interface 6 in the state VZ connected to said external appliance.

The external appliance 7 is designed, in the state VZ connected to the communication interface 6, to wirelessly transmit, in particular transmits, the erasure command LB thereto.

The device 1, in particular the control device 8, is additionally designed, temporally after transmission of the operating data BD, in particular of the usage data UD, to erase, in particular erases, the transmitted operating data BD from the operating data memory 5 on account of the transmission.

The device 1 furthermore has an electrical energy store 12, in particular a battery 12'. The device 1 is designed to supply, in particular supplies, at least the communication interface 6, in particular and the recording and/or evaluation device 3, 4, the operating data memory 5, the output device 9, the identification device 10 and/or the control device 8 with electrical energy from the electrical energy store 12.

In the exemplary embodiment that is shown, the device 1 is additionally designed to supply, in particular supplies, at least the communication interface 6, in particular and the recording and/or evaluation device 3, 4, the operating data memory 5, the output device 9, the identification device 10 and/or the control device 8 with electrical energy from the battery 15, when connected to the battery-operated tool 2', by way of the cable 16.

The device 1, at least when the drive motor 11 of the tool 2 is in an off state off, in particular when the tool 2 is in an inoperative state BUZ, is furthermore designed to wirelessly transmit and/or output the connection information VI and/or to output the maintenance information WI and/or the fault information FI, in particular and/or the compliance information BI, in particular transmits and/or outputs said information.

In the exemplary embodiment that is shown, the tool 2 has the inoperative state BUZ if the battery-operated tool 2' is not connected to the battery 15.

The device 1 additionally has an operating element 13 able to be actuated by a user, in the form of a pushbutton in the exemplary embodiment that is shown.

The device 1 is additionally designed, if the operating element 13 has been actuated, to output, in particular outputs, the connection information VI and/or the maintenance information WI and/or the fault information FI, in particular and/or the compliance information BI.

The operating element 13 is additionally designed for a user to input the compliant state BZ and/or the maintenance state WZ and/or the fault state FZ and/or another state, in particular a reservation state RZ, of the tool 2 into the device 1, in particular wherein, for the user input, the operating element 13 needs to be actuated for a predefined duration, such as at least three seconds.

The external appliance 7 is also designed for a user to input at least one item of user information BUI regarding the compliant state BZ and/or the maintenance state WZ and/or the fault state FZ and/or the other state, in particular the reservation state RZ, in particular for wireless transmission to and/or storage in the device 1 and/or a database 25, in particular of the system 20.

In detail, the system 20 is designed, based on actuation of the operating element 13, to authorize the user input and/or the wireless transmission and/or the storage of the user information BUI.

In the exemplary embodiment that is shown, the tool 2 is a saw 2".

By way of example, when working with the saw 2" in a forest, a saw chain and a guide bar of the saw 2" may make contact with the ground. This may lead to a defect with the saw chain and/or with the guide bar. It may be the case that the identification device is not able to identify this defect or the fault state FZ of the tool 2. In order to prevent another user who is unaware of the defect from working with the tool 2, and/or in order to allow a workshop employee to become aware of the defect, the fault state FZ may be input into the device 1 by way of the operating element 13. The in particular more comprehensive user information BUI about the fault state, in particular the contact and/or the saw chain and/or the guide bar, may additionally be input by way of the external appliance 7.

The output device 9 may furthermore output the reservation state RZ by way of reservation information RI through alternate lighting of the green LED 9', the yellow LED 9" and the red LED 9'". In alternative exemplary embodiments, the output device may additionally or alternatively output the reservation information through another color.

The device 1 may furthermore confirm the user input through a color change and/or a brief flash.

The recording and/or evaluation device 3, 4, the operating data memory 5, the communication interface 6, the output device 9, the identification device 10, the electrical energy store 12, the operating element 13 able to be actuated by a user and/or the control device 8 are additionally electrically connected to one another.

As elucidated in the exemplary embodiments shown and explained above, the invention provides a device for recording operating data of a motorized tool, wherein the device has improved properties, a system having such a device and a method for operating such a device, in particular such a system.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device configured to be arranged on a motorized tool, comprising:

a recording and evaluation device;

an operating data memory; and a communication interface, wherein the recording and evaluation device is configured to:

(i) record a variable that is dependent on an operating state of the motorized tool, and evaluate the recorded variable in order to identify operating data of the motorized tool, or (ii) record the operating data of the motorized tool;

wherein the operating data memory is configured to store the identified or recorded operating data;

wherein the communication interface is configured to wirelessly transmit the stored operating data from the device to an external appliance when in a connected state to the external appliance, wherein the external appliance is different from the motorized tool and the device, and wherein the device is different from the motorized tool, wherein, when at least one connection criterion is met by the operating data, or when the operating data have not been erased from the operating data memory, or when the operating data have not been transmitted, the device is further configured to:

wirelessly transmit connection information to the external appliance, which connection information is different from the operating data, regarding meeting of the connection criterion in a transmission state different from the connected state via the communication interface, wherein the transmission state is an advertisement state and the connection information is an advertising event, and wherein the device is further configured to transmit the connection information via the communication interface regardless of whether or not the external appliance is within a reception range or regularly and temporally after respective transmission of the communication information, listen via the communication interface for a request from the external appliance to set up the connected state, wherein the operating data contain usage data including at least one time, and a drive motor of the motorized tool had an on state at the at least one time, and wherein the device is further configured to:

(a) erase the operating data based on an erasure command from the operating data memory that is transmitted wirelessly by the external appliance via the communication interface in the connected state to the external appliance, or (b) temporally after transmission of the operating data, erase the transmitted operating data from the operating data memory on account of the transmission.

2. The device according to claim 1, further comprising:

an identification device configured to identify a maintenance state and a fault state, different from the maintenance state, of the motorized tool based on the identified or recorded operating data, wherein the maintenance state and the fault state are identified when values of the operating data fall below, reach, or exceed respective predefined threshold values; and an output device configured to:

output maintenance information when the maintenance state is identified, and output fault information that is different from the maintenance information when the fault state is identified, wherein the output device has a display or an output of the output device is optical.

3. The device according to claim 1, further comprising:

an identification device configured to identify a maintenance state and a fault state, different from the maintenance state, of the motorized tool based on the identified or recorded operating data, wherein the connection criterion is the fact that the maintenance state and/or the fault state are/is identified, and the connection information contains maintenance information and/or fault information.

4. The device according to claim 3, wherein the operating data are characteristic for a compliant state different from one of:

(i) the maintenance state and the fault state, (iii) the maintenance state, or (iii) the fault state, of the motorized tool.

5. The device according to claim 1, wherein the operating data are of different types, and the connection information contains type information about a type of operating data meeting the connection criterion.

6. The device according to claim 1, further comprising:

an electrical energy store, wherein the device is further configured to supply at least the communication interface with electrical energy from the electrical energy store.

7. The device according to claim 1, wherein at least when a drive motor of the motorized tool is in an off state, the device is further configured to wirelessly transmit and/or output the connection information and/or to output maintenance information and/or fault information.

8. The device according to claim 1, further comprising:

an operating element able to be actuated by a user, wherein the device is further configured to output:

the connection information, maintenance information, and/or fault information, when the operating element has been actuated.

9. The device according to claim 2, further comprising:

an operating element able to be actuated by a user, wherein the operating element is configured for a user to input at least one of:

a compliant state different from the maintenance state and the fault state, the maintenance state, or the fault state, of the motorized tool into the device.

10. The device according to claim 9, wherein the compliant state is a reservation state.

11. A system, comprising:
a device according to claim 1; and
the motorized tool.

12. The system according to claim 11, further comprising:
the external appliance, which is a mobile external appliance configured to perform at least one of:
in the state connected to the communication interface, wirelessly transmit the stored operating data,
in a reception state different from the connection state, wirelessly receive the wirelessly transmitted connection information,
in the state connected to the communication interface, wirelessly transmit an erasure command thereto, or
for a user to input at least one item of:
user information regarding a compliant state,
a maintenance state,
a fault state for wireless transmission, and/or
storage in the device and/or a database.

13. The system according to claim 12, wherein the device further comprises:
an operating element able to be actuated by a user, wherein
the system is further configured to authorize:
the user input,
the wireless transmission, and/or
the storage of the user information,
based on actuation of the operating element.

14. A method for operating a device arranged on a motorized tool, comprising:
(i) recording a variable, which is dependent on an operating state of the motorized tool, and
evaluating, via a recording and evaluation device of the device, the recorded variable in order to identify operating data of the motorized tool, or
(ii) recording the operating data of the motorized tool, via the recording and evaluation device,
the operating data containing usage data including at least one time, and a drive motor of the motorized tool having had an on state at the at least one time;

storing the identified or recorded operating data via an operating data memory of the device;

when at least a connection criterion is met by the operating data, or when the operating data have not been erased from the operating data memory, or when the operating data have not been transmitted:

wirelessly transmitting connection information, which connection information is different from the operating data, regarding meeting of the connection criteria in a transmission state different from a connected state via a communication interface of the device to an external appliance, wherein the external appliance is different from the motorized tool and the device and wherein the device is different from the motorized tool, wherein the transmission state is an advertisement state and the connection information is an advertising event, and the method further comprising transmitting the connection information via the communication interface regardless of whether or not the external appliance is within a reception range, or regularly and temporally after respective transmission of the connection information, listening via the communication interface for a request from the external appliance to set up the connected state, the method still further comprising:

erasing the operating data based on an erasure command from the operating data memory that is transmitted wirelessly by the external appliance via the communication interface in the connected state to the external appliance, or erasing, temporally after transmission of the operating data, the transmitted operating data from the operating data memory on account of the transmission.

15. The device according to claim 1, wherein
the device is configured to be releasably connected to the motorized tool.

* * * * *